Nov. 28, 1933.   J. A. SHAFER   1,936,645
CAR TRUCK
Filed Aug. 10, 1929   3 Sheets-Sheet 1
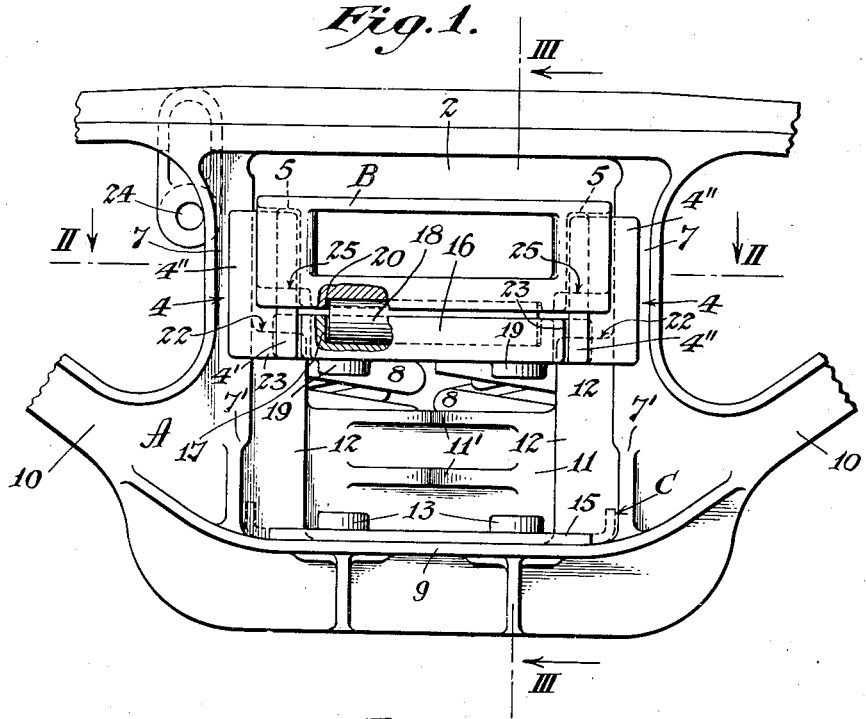
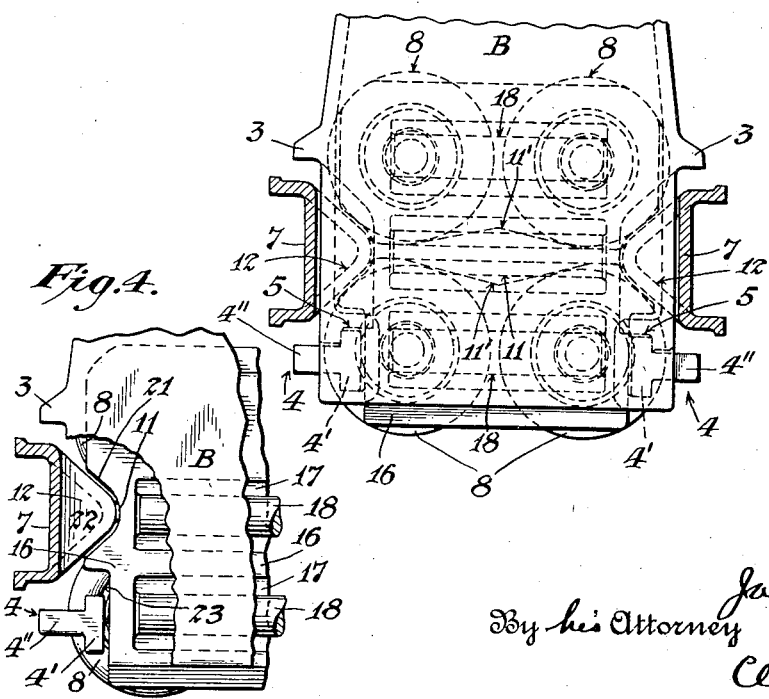

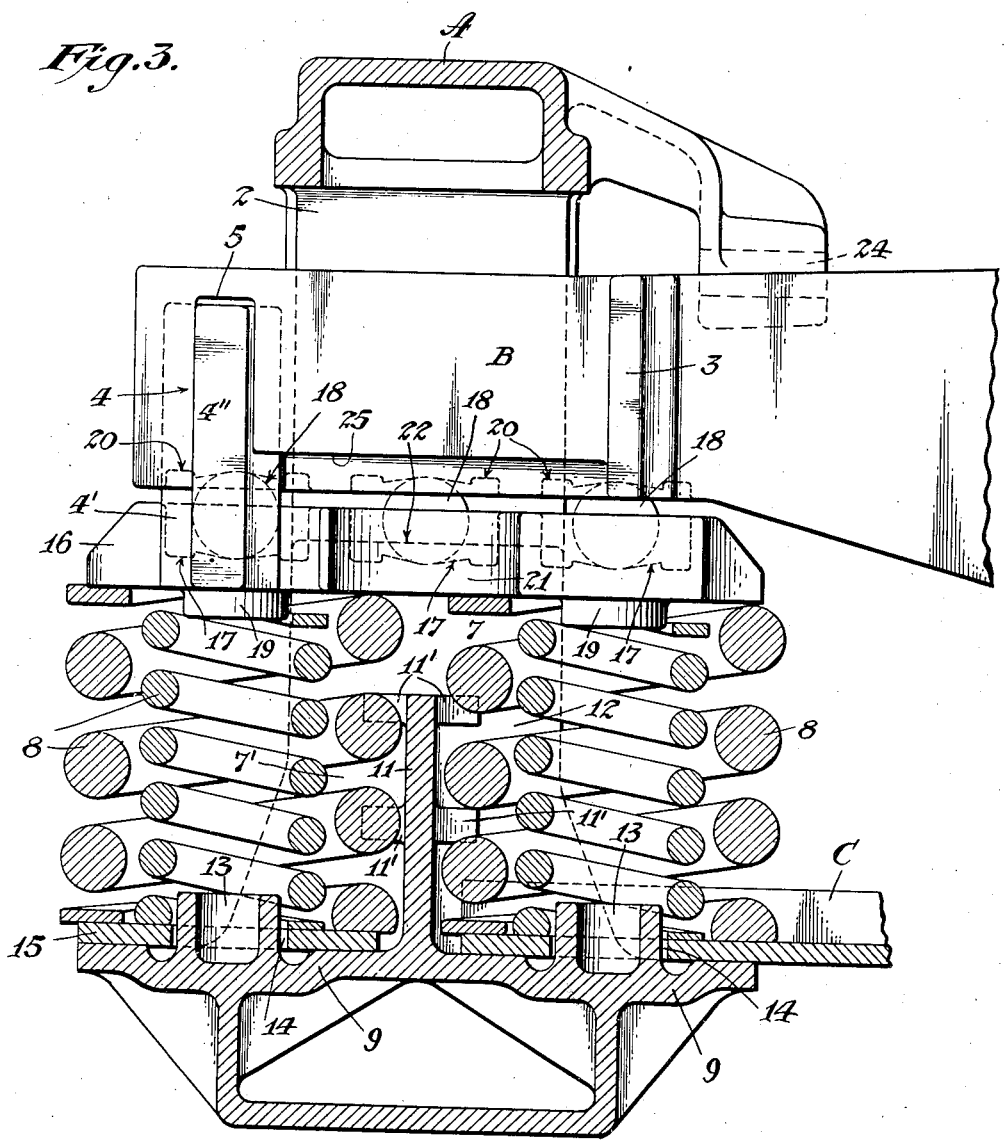

Nov. 28, 1933. J. A. SHAFER 1,936,645
CAR TRUCK
Filed Aug. 10, 1929 3 Sheets-Sheet 3

Inventor
James A. Shafer
By his Attorney
Clarence D. Kerr

Patented Nov. 28, 1933

1,936,645

UNITED STATES PATENT OFFICE 1,936,645

CAR TRUCK

James A. Shafer, East Cleveland, Ohio, assignor to National Malleable & Steel Castings Co., Cleveland, Ohio, a corporation of Ohio Application August 10, 1929. Serial No. 384,907

11 Claims. (Cl. 105—197)

This invention relates to car trucks. In my pending application, Serial No. 319,500, filed November 15, 1928, I have disclosed a car truck presenting the advantages of increased strength, greater spring bearing area, greater spring capacity, and facility of assembly and disassembly. One of the objects of the present invention is the provision of a truck possessing these advantages in combination with means whereby lateral movement between the bolster and the side frames may be facilitated. The invention also provides for the support of the aforesaid lateral motion means by the truck springs, while at the same time protection is afforded against the driving solid of the springs and lateral motion devices by downward movement of the bolster. A further feature resides in the provision of a truck wherein said lateral motion means may remain in assembled position on the truck along with the bolster and other parts during removal and change of wheels. Other features of the invention will be hereinafter described and claimed.

In the accompanying drawings:

Fig. 1 is a fragmentary side elevation of a car truck embodying my invention, the outer set of springs being removed for the sake of clearness.

Fig. 2 is a section on line II—II of Fig. 1, showing a portion of the truck bolster in top plan.

Fig. 3 is a section on line III—III of Fig. 1 showing the bolster and other parts in side elevation.

Fig. 4 is a view of a detail.

Figure 5:
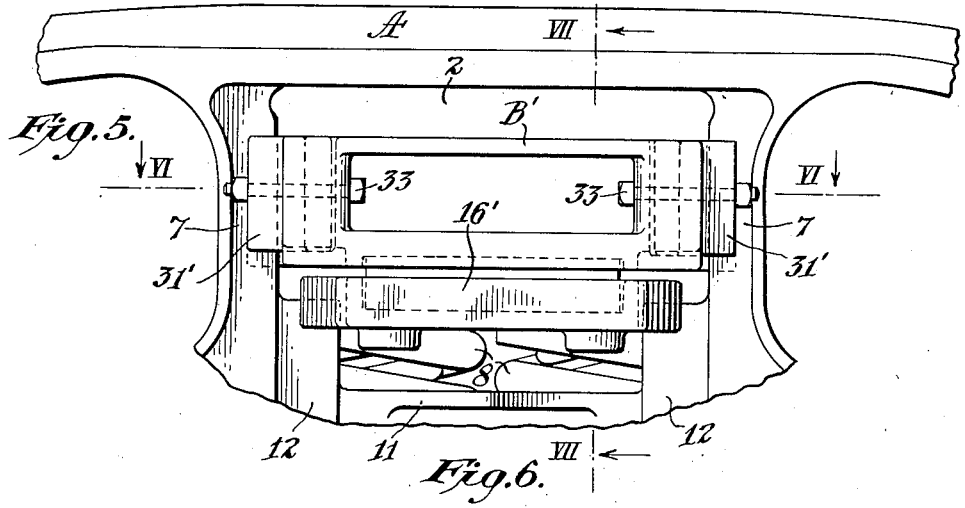
Fig. 5 is a fragmentary side elevational view similar to Fig. 1 but showing a different retaining means for the bolster.

Referring more particularly to the drawings, A represents one of the side frames of my improved truck, B the bolster, and C a spring plank. The side frame A has a window opening 2 for the reception of the bolster. The bolster is shown provided with the usual inner lugs 3, and with removable T-shaped retaining pieces 4, 4 the heads 4' of which seat in vertically disposed recesses 5 in said bolster, and the stems 4'' of which extend outwardly beyond the sides of the bolster to form outer flanges adapted to engage the outer faces of the side frame columns 7. Preferably, as shown, the recesses 5 do not extend clear through to the top of the bolster, and the retaining pieces 4 are held in place between the ends of said recesses and springs 8, seated on the shelf portions 9 of the side frame. Due to the omission of the usual outer guide flanges of the bolster and the provision of the removable bolster retaining pieces 4, 4, it is not necessary to have the usual deep off-sets in the side frame columns 7. The latter, as shown, are carried downwardly to merge with the tension members 10 of the side frame.

Extending vertically upward from the center of the spring seat portion of the side frame is a reinforcing web 11. The latter, through bifurcated extensions 12, 12 at its opposite ends, merges into the portions 7' 7' of the side frame which lies directly beneath the columns 7, 7, and which in the absence of said web 11 and extensions 12 would constitute the lower portions of said columns. It will be seen that the web 11 serves to tie together said portions 7', 7', so that the latter, together with the extensions 12, 12, and web 11, become integral parts of the tension members 10. This arrangement results in the shortening of the columns 7, 7, so that the latter are greatly strengthened. Said web 11 may be strengthened against buckling by means of laterally extending ribs 11'. The shelves 9, 9 extend on opposite sides of the web 11 and are provided with dowels 13 for centering the springs 8. The spring plank C bears on the inner shelf 9 and is held thereon by means of the dowels 13 which seat in the holes 14 in said plank. The springs 8, of which four sets are shown, are preferably class G springs giving a greater spring capacity than the usual arrangement and types of springs normally used for supporting and cushioning the bolster. The inner sets of springs 8 are seated on the spring plank C while the outer sets rest upon a spring plate 15 which brings said outer springs to the same level as the inner sets of springs. Between the bolster and the springs 8, I interpose a member 16 having depressions or seats 17 therein for anti-friction bearing elements such as rollers 18. Said member 16, in addition to serving as a seat for said rollers, also constitutes a cap for the springs 8 and may be provided with downwardly extending bosses 19 for centering said springs. The bolster is shown provided in its under surface with seats or bearing portions 20, complemental to the depressions 17, for receiving the rollers 18. It will thus be seen that lateral play between the bolster and side frame is facilitated and may readily take place within the limits determined by the bolster lugs 3 and flanges 4'', in conjunction with the side frame columns 7.

For guiding the roller seat member 16 in its movements upwardly and downwardly within the window opening 2, I extend the bifurcated columns 12, 12 a substantial distance above the web 11, and I provide said roller seat member with portions in the form of channels 21, 21 which receive the respective column extension 12, 12, as shown. It will be seen that the columns and channels aforesaid cooperate to form an effective means for guiding the roller seat 16 in its vertical movements, and also for maintaining it in proper relation to the side frame. Preferably, the surfaces of said channel or bearing portions 21, 21 are spaced slightly from the cooperating column surfaces, as shown, to avoid unnecessary wear.

In addition to constituting guiding means for the roller seat, the extensions of the columns 12, 12 above the web 11 serve to further strengthen the side frame. Also, the tops of said extensions form shelves or stops 22, 22 for limiting downward movement of the bolster. The bolster is shown with undercut surfaces 25, 25 adapted to seat upon the shelves 22, 22 when the bolster has moved downwardly the desired limit. Said shelves 22, 22 are positioned at such distance with respect to the springs 8 that they stop the bolster from moving downwardly sufficiently to drive said springs solid. At the same time it will be noted that the shelves aforesaid do not limit downward movement of the roller seat 16, the channels 21, 21 extending the entire distance from top to bottom of said seat, and that the latter is at all times supported by the springs 8. It will thus be seen that all blows by the bolster upon the rollers 18 and seat 16 are resiliently taken up by the springs and that danger of damages to the rollers, such as might occur if the springs were driven solid, is prevented by the shelves 22, 22. It may be further noted that the seat 16 does not come into contact with the top of the web 11, and that due to the shelves 22, 22, the driving of said seat against said web by the bolster is precluded.

At opposite sides of its forward portion the roller seat 16 is shown cut away, as at 23, 23, so as to clear the bolster retaining members 4, 4.

While I have shown and specifically described but one side frame of the truck and its relation to the bolster, it will be understood that I contemplate that the other side frame be the same in construction as the one herein described and that it cooperate with the corresponding end of the bolster in the same manner.

In assembling my improved truck, the spring plank C is set up over the track on blocking. The inner sets of springs 8 are next put in place on the plank C, the roller seats 16, one for each end of the bolster, placed on the respective inner sets of said springs 8, and the bolster rested on the rollers in said seats. The brake rigging is then assembled, after the wheels and axles are rolled into position. The side frames A are then moved over the journals and bolster ends until the dowels 13 come opposite the holes 14 in the spring plank, and the columns 12 come opposite the channels 21 in the roller seats. The retaining pieces 4 are slid by a vertical movement into the recesses 5 in the bolster; and the outer sets of springs 8 are next placed in position on the respective outer shelves 9 on spring plates 15, said outer sets of springs being centered by the dowels 13 in such position as to support both the roller seats 16 and retaining pieces 4, and also preventing separation of said retaining pieces and the bolster. The side frames are finally jacked up, bringing the inner pairs of dowels 13 into engagement with the holes 14 in the spring plank, and also bringing the upper portions of the columns 12 into the channels 21. The brake hanger pins are then inserted at 23, the journal bearings and wedges are put in place, and the blocking is removed. The truck has now been completely assembled and the jacks are lowered and removed.

The changing of wheels in my improved structure is a simple matter. I first jack up the side frames, place blocking underneath the spring plank C, remove the four brake hanger pins at 24, and then remove the jacks. The outer sets of springs 8 are now free to be removed and after they are taken out the retaining pieces 4 are dropped to disengage them from their end of the bolster. Also, the columns 12 of the side frames are now out of engagement with the roller seat channels 21. The side frames may now be pulled off the axles and bolster, leaving the wheel and axle assemblies free to be removed. It will thus be seen that the removal of the wheels can be effected without disturbing the bolster, rollers, roller seats, spring plank, inner sets of springs, or the brake rigging.

It may be pointed out that by limiting the downward movement of the bolster through the stop shoulders 22, 22, instead of by the web 11, not only is damage to the rollers 18 avoided, but furthermore the bending moment to which the side frame is subjected by stopping of the bolster by shoulders 22, 22 is less than would be the case if the bolster were stopped by said web. Thus the fibre stress in the tension members is reduced.

Figure 6:
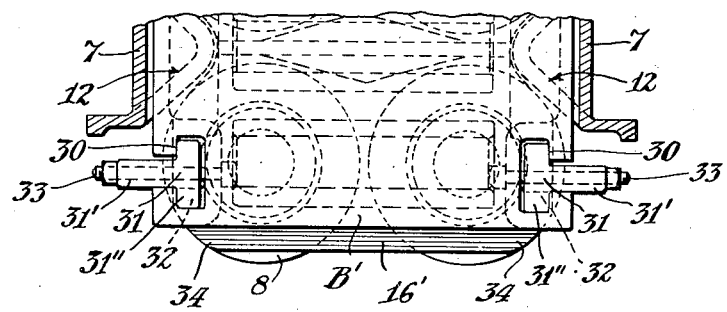
Fig. 6 is a section on line VI—VI of Fig. 5, showing a portion of the bolster in top plan.
Figure 7:
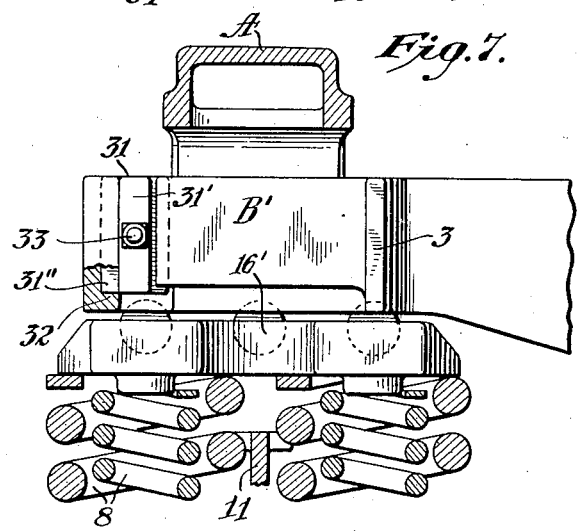
Fig. 7 is a section on line VII—VII of Fig. 5, the bolster and other parts being shown in side elevation.

In Figs. 5, 6 and 7, I have shown T-shaped recesses 30, 30 cut into the top of the bolster and extending downwardly in said bolster. T-shaped bolster-retaining members 31, 31 are received in said slots, the stems 31', 31' of said members extending beyond the sides of the bolster and being engageable with the side frame columns 7, 7 to retain the bolster against removal.

Each of the retaining members 31, 31 is adapted to rest upon a ledge 32 at the bottom of the corresponding recess 30, said ledge being shown as extending under the flange portion 31'' of the associated retaining member. In addition, said members 31, 31 may be secured to the bolster by bolts 33, 33, whereby said members are prevented from jumping upwards and becoming permanently displaced. It will be seen that said retaining members 31, 31 are insertible into the recesses 30, 30 from the top of the bolster. Also, with this construction the retaining members do not rest upon the bolster-supporting springs, and thus wear between said springs and the bottoms of said members is prevented. Furthermore, with this bolster-retaining arrangement it is unnecessary to provide the roller seat member 16' with the cut away portions 23, 23 shown in Figs. 1 and 4, and said roller seat member may instead be extended at each of its outer corners as shown at 34, 34 to completely cover the two outer bolster supporting springs and thus to provide increased spring bearing area. In addition, with this bolster-retaining means the changing of wheels is facilitated, since the members 31, 31 can be withdrawn from the bolster recesses 30, 30 without removing the outer bolster-supporting springs, and the latter can be left in place and removed along with the side frame.

The terms and expressions which I have employed are used as terms of description and not of limitation, and I have no intention, in the use of such terms and expressions, of excluding any mechanical equivalents of the features shown and described or portions thereof, but recognize that various structural modifications are possible within the scope of the invention claimed.

What I claim is:

1. In a car truck, a bolster, a side frame having a central opening with vertical columns at the sides thereof adapted to receive an end of the bolster therebetween, extensions on the bolster adapted to engage said columns on one side thereof, means removably mounted in said bolster and adapted to engage said columns on the opposite side thereof, said means being insertable and removable by a vertical movement, springs on the side frame, and means on said springs whereby said bolster is freely mounted for movement laterally of the side frame within the limits provided by said extensions, and said removable means, said first-named means being insertable in place subsequent to positioning of said second-named means in assembling the truck.

2. In a car truck, a bolster, a side frame having a central opening with vertical columns at the sides thereof adapted to receive an end of the bolster therebetween, means comprising elements separately and removably mounted in said bolster and having flanges adapted to engage the respective columns, springs on the side frame for supporting the bolster and maintaining said removable means in position in said bolster, and means between said bolster and said springs whereby the bolster is supported for movement laterally with respect to the side frame.

3. In a car truck, a bolster, a side frame having a central opening with vertical columns at the sides thereof adapted to receive an end of the bolster therebetween, means removably mounted in said bolster and provided with flanges adapted to engage said columns, springs on said side frame, a member mounted on said springs and provided with anti-friction elements for supporting said bolster for movement laterally of the side frame, the front side portions of said member being cut away to accommodate said removable means, said means being removable independently of said member in disassembling the truck.

4. In a car truck, a bolster, a side frame having a central opening with vertical columns at the sides thereof adapted to receive an end of the bolster therebetween, means removably mounted in said bolster and comprising flanges adapted to engage said columns, springs on the side frame for supporting the bolster, and maintaining said removable means in position in said bolster, a member separate from said removable means, said member being mounted on said springs and provided with anti-friction elements for supporting said bolster for movement laterally of the side frame, and bosses projecting downwardly from said member for centering said springs.

5. In a car truck, a bolster, a side frame having a central opening with vertical columns at the sides thereof adapted to receive an end of the bolster therebetween, a web extending below the window opening for reinforcing said side frame, springs on said side frame, means between said bolster and said springs whereby the bolster is supported for movement laterally of the side frame, and means above said web for protecting the springs against being driven solid.

6. In a car truck, a bolster, a side frame having a central opening with vertical columns at the sides thereof adapted to receive an end of the bolster therebetween, means between said bolster and said springs whereby the bolster is supported for movement laterally with respect to the side frame, and means for limiting downward movement of the bolster, said last mentioned means comprising guide columns extending into channels in the bolster supporting means.

7. In a car truck, a bolster, a side frame having a central opening with vertical columns at the sides thereof adapted to receive an end of the bolster therebetween, a spring seat in said side frame, springs on said seat for supporting the bolster, a reinforcing web for said side frame projecting upwardly from said spring seat, and stop means above said web for preventnig the bolster from driving the springs solid.

8. In a car truck, a bolster, a side frame having a central opening with vertical columns at the sides thereof adapted to receive an end of the bolster therebetween, a spring seat in said side frame, springs on said seat for supporting the bolster, and stop means above said web and adjacent said columns for preventing the bolster from driving the springs solid.

9. In a car truck, a bolster, a side frame having a central opening with vertical columns at the sides thereof adapted to receive an end of the bolster therebetween, said bolster having recesses in said end extending downwardly from the upper surface of the bolster and bolster retaining elements adapted to cooperate with said columns and insertable into said recesses from the upper surface of the bolster.

10. In a car truck, a bolster, a side frame having a central opening with vertical columns at the sides thereof adapted to receive an end of the bolster therebetween, said bolster having recesses in said end extending downwardly from the upper surface of the bolster, and bolster retaining elements adapted to cooperate with said columns and insertable into said recesses from the upper surface of the bolster and means for retaining said elements in said recesses.

11. In a car truck, a bolster, a side frame having a central opening with vertical columns at the sides thereof adapted to receive an end of the bolster therebetween, extensions on the bolster adapted to engage said columns on one side thereof, elements having tongue and groove connection with the bolster and each adapted to engage the opposite side of a respective one of said columns, springs on the side frame, and means on said springs whereby said bolster is freely mounted for movement laterally of the side frame within the limits provided by said extensions and said elements.

JAMES A. SHAFER.